(12) United States Patent
Rouillon et al.

(10) Patent No.: US 12,113,223 B2
(45) Date of Patent: Oct. 8, 2024

(54) METHOD FOR PRODUCING A GAS DIFFUSION DEVICE HAVING IMPROVED ELECTRICAL PROPERTIES

(71) Applicant: COMMISSARIAT A L'ÉNERGIE ATOMIQUE ET AUX ENERGIES ALTERNATIVES, Paris (FR)

(72) Inventors: Ludovic Rouillon, Grenoble (FR); Joël Pauchet, Grenoble (FR); Jean-Philippe Poirot-Crouvezier, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 156 days.

(21) Appl. No.: 17/623,793

(22) PCT Filed: Jul. 1, 2020

(86) PCT No.: PCT/FR2020/051150
§ 371 (c)(1),
(2) Date: Dec. 29, 2021

(87) PCT Pub. No.: WO2021/001629
PCT Pub. Date: Jan. 7, 2021

(65) Prior Publication Data
US 2022/0246946 A1    Aug. 4, 2022

(30) Foreign Application Priority Data
Jul. 1, 2019 (FR) .................................. 19 07260

(51) Int. Cl.
*H01M 4/88* (2006.01)
*H01M 4/86* (2006.01)
(Continued)

(52) U.S. Cl.
CPC ....... *H01M 4/8807* (2013.01); *H01M 4/8605* (2013.01); *H01M 8/0239* (2013.01); *H01M 8/0245* (2013.01); *H01M 8/026* (2013.01)

(58) Field of Classification Search
None
See application file for complete search history.

(56) References Cited

U.S. PATENT DOCUMENTS

| 4,579,789 A | * | 4/1986 | Fukuda | ............... H01M 8/0258 429/534 |
| 2004/0209152 A1 | | 10/2004 | Yamada et al. | |

(Continued)

OTHER PUBLICATIONS

International Search Report issued Nov. 25, 2020 in PCT/FR2020/051150 filed Jul. 1, 2020, 3 pages.

*Primary Examiner* — Haroon S. Sheikh
(74) *Attorney, Agent, or Firm* — Oblon, McClelland, Maier & Neustadt, L.L.P.

(57) ABSTRACT

A process for manufacturing a gas diffusion device includes providing a superposition of a composite layer and of an electrically conductive element, the composite layer including electrically conductive fibers and a polymerizable resin impregnating the conductive fibers, and the electrically conductive element having an open porosity between a first face and a second face. The process also includes compressing the superposition of the composite layer and of the conductive element so as to bring said conductive fibers into contact with the first face of the element, so as to make said resin flow into said element without the resin impregnating all the volume of said conductive element; and polymerizing the resin.

17 Claims, 9 Drawing Sheets

(51) Int. Cl.
*H01M 8/0239* (2016.01)
*H01M 8/0245* (2016.01)
*H01M 8/026* (2016.01)

(56) References Cited

U.S. PATENT DOCUMENTS

| | | |
|---|---|---|
| 2005/0026012 A1 | 2/2005 | O'Hara |
| 2005/0255372 A1* | 11/2005 | Lertola ................. H01M 8/242 |
| | | 429/534 |
| 2006/0078784 A1 | 4/2006 | Liu et al. |
| 2007/0154779 A1 | 7/2007 | Ko et al. |
| 2008/0149900 A1 | 6/2008 | Jang et al. |
| 2013/0040228 A1* | 2/2013 | Buche ................. H01M 8/0234 |
| | | 429/510 |
| 2013/0171547 A1 | 7/2013 | Tanno |
| 2017/0244107 A1 | 8/2017 | Utsunomiya et al. |
| 2019/0027761 A1 | 1/2019 | Miyake et al. |
| 2019/0123359 A1 | 4/2019 | Morin et al. |

\* cited by examiner

METHOD FOR PRODUCING A GAS DIFFUSION DEVICE HAVING IMPROVED ELECTRICAL PROPERTIES

The invention relates to the manufacture of electrochemical reactors, and in particular to the manufacture of gas diffusion devices for electrochemical reactors.

Among electrochemical reactors, fuel-cell stacks are undergoing substantial development. It is notably envisioned to use fuel-cell stacks as power sources in future mass-produced motor vehicles or as auxiliary power sources in aeronautics. A fuel-cell stack is an electrochemical device that converts chemical energy directly into electrical energy. A fuel-cell stack comprises a stack in series of a plurality of cells. Each cell typically generates a voltage of the order of 1 volt, and stacking cells allows a higher supply voltage, for example one of the order of one hundred volts, to be generated.

Among the known types of fuel-cell stacks, mention may notably be made of the PEM fuel-cell stacks (PEM being the acronym of proton exchange membrane), which operate at low temperature. Such fuel-cell stacks have particularly advantageous properties as regards compactness. Each cell comprises an electrolytic membrane allowing only the passage of protons and not the passage of electrons. The membrane comprises an anode on a first face and a cathode on a second face, so as to form a membrane-electrode assembly (MEA).

At the anode, the dihydrogen used as fuel is oxidized to produce protons that pass through the membrane. The membrane thus forms an ionic conductor. The electrons produced by this reaction migrate to a flow plate, then pass through an electrical circuit external to the cell to form an electrical current. At the cathode, oxygen is reduced and reacts with the protons to form water.

The fuel-cell stack may comprise, stacked on top of one another, a plurality of what are called bipolar plates, made of metal for example. The membrane is placed between two bipolar plates. The bipolar plates may comprise flow channels and orifices for continuously guiding reagents and products to/from the membrane. The bipolar plates continuously feed the reactive zone of the electrodes with reagents, as they are consumed. The bipolar plates also comprise flow channels for guiding coolant that removes the heat produced. Reaction products and unreacted species are removed via entrainment by the flow to the outlet of the networks of flow channels. The flow channels of the various flows are notably separated by way of the bipolar plates.

The bipolar plates are also electrically conductive, with a view to collecting the electrons generated at the anode. The bipolar plates also play the role of an impermeable partition between the anode circuit and the cathode circuit. The bipolar plates also play a mechanical role transmitting the stack clamping forces necessary to the quality of the electrical contact. Gas diffusion layers are generally interposed between the electrodes and the bipolar plates and make contact with the bipolar plates. The gas diffusion layers are placed on either side of the membrane-electrode assembly with a view to ensuring electrical conduction, the uniform arrival of the reagent gases, and the removal of the water produced. The gas diffusion layers for example take the form of carbon fabrics or felt.

Electronic conduction occurs through the bipolar plates, ionic conduction occurring through the membrane.

One of the obstacles to the uptake of fuel-cell technologies is the cost of manufacturing and assembling their various components. The manufacture of the bipolar plates represents most of the cost of a fuel-cell stack.

Document US2007/0154779 describes a process for manufacturing fibers pre-impregnated with resin, intended for the formation of porous electrodes. The process is intended to form voids in the resin to make it porous.

Document US2006/078784 describes a process for manufacturing a gas diffusion device.

Document US2019/027761 describes a gas diffusion device. The formed gas diffusion device comprises a stack of porous layers.

Document US2019/123359 describes a conductive fibrous structure impregnated with a hydrophobic resin.

One known technology for manufacturing a bipolar plate involves stamping metal sheets. Two stamped metal sheets are most often assembled by welding to define reagent flow channels in the external faces of the assembly, and to define coolant flow channels between the sheets. Seals are placed in suitable locations to seal the flows of the various fluids. Metal sheets have good mechanical properties and form effective barriers with respect to limiting the diffusion of dihydrogen. However, metal sheets have low corrosion resistance. In addition, their degradation may form cations that contaminate the membrane and decrease the performance and lifetime of the fuel-cell stack. In order to decrease these problems, surface treatments of the metal sheets are frequently implemented. However, these surface treatments improve the corrosion resistance insufficiently for certain applications and induce a non-negligible additional cost.

Another known technology for manufacturing a bipolar plate consists in molding a composite sheet, i.e. a sheet of composite material, in order to define the shapes of the various flow channels. The composite sheet includes a fiber-reinforced resin matrix. Resins are generally electrically insulating and require incorporation of a large amount of conductive filler to make the sheet conductive. Incorporation of a large amount of conductive filler into a resin greatly decreases the mechanical properties of the obtained composite sheet.

The invention aims to solve one or more of these drawbacks. The invention thus relates to a process for manufacturing a gas diffusion device, such as defined in the appended claim 1.

The invention also relates to variants of the dependent claims. Those skilled in the art will understand that each of the features disclosed in the description and in the dependent claims may be combined independently with the features of an independent claim, without however constituting an intermediate generalization.

The invention also relates to a gas diffusion device, such as defined in the appended claims.

Other features and advantages of the invention will become more clearly apparent from the completely non-limiting description that is given thereof below, by way of indication, with reference to the appended drawings, in which:

FIG. 1 is an exploded perspective view of an example of a stack of membrane-electrode assemblies and of bipolar plates for a fuel-cell stack;

FIG. 2,

FIG. 3 and

FIG. 4 are cross-sectional views of a gas diffusion device in various steps of its manufacturing process according to a first embodiment, which is said to employ lateral flow;

FIG. 5,

FIG. 6 and

Figure 1:
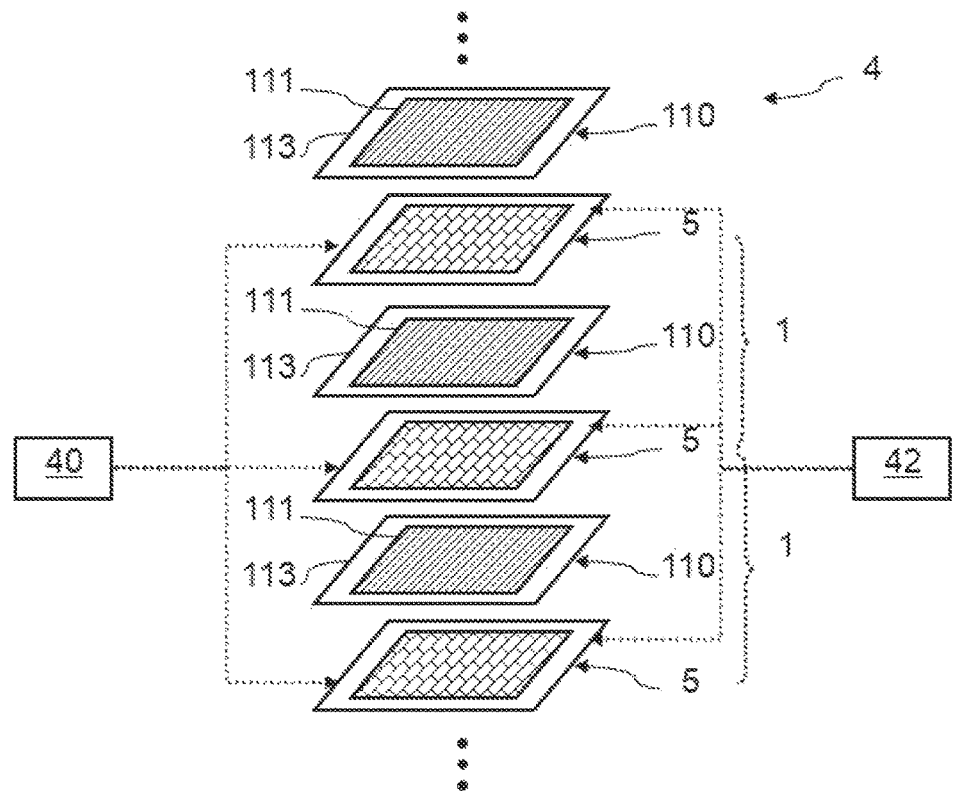

FIG. 1 is a schematic exploded perspective view of a stack of cells 1 of a fuel-cell stack 4. The fuel-cell stack 4 comprises a plurality of superposed cells 1. The cells 1 are proton-exchange-membrane or polymer-electrolyte-membrane cells.

The fuel-cell stack 4 comprises a fuel source 40. The fuel source 40 here supplies dihydrogen to an inlet of each cell 1. The fuel-cell stack 4 also comprises an oxidizer source 42. The oxidizer source 42 here supplies air to an inlet of each cell 1, the oxygen of the air being used as oxidant. Each cell 1 also comprises exhaust channels. One or more cells 1 also comprise a cooling circuit.

Each cell 1 comprises a membrane-electrode assembly 110 or MEA 110. A membrane-electrode assembly 110 comprises an electrolyte 113, and a cathode (not illustrated) and an anode 111 placed on either side of the electrolyte and fastened to this electrolyte 113. The electrolyte layer 113 forms a semi-permeable membrane that conducts protons while being impermeable to the gases present in the cell. The electrolyte layer also prevents the passage of electrons between the anode 111 and the cathode.

A bipolar plate 5 is placed between each pair of adjacent MEAs. Each bipolar plate 5 defines anode flow channels and cathode flow channels on opposite external faces. Some of the bipolar plates 5 advantageously also define channels for flowing coolant between two successive membrane-electrode assemblies.

In a manner known per se, during the operation of the fuel-cell stack 4, air flows between an MEA and one bipolar plate, and dihydrogen flows between this MEA and another bipolar plate. At the anode, the dihydrogen is oxidized in order to produce protons which pass through the MEA. At the cathode, oxygen is reduced and reacts with the protons to form water. The electrons produced by the oxidation of the hydrogen are collected by a bipolar plate 5. The produced electrons are then applied to an electrical load connected to the fuel-cell stack 1, to form an electrical current. During its operation, a cell of the fuel-cell stack usually generates, between the anode and cathode, a DC voltage of the order of 1V.

The bipolar plates 5 may each be formed, in a manner known per se, from two assembled conductive metal sheets, which are for example made of stainless steel, or of a titanium alloy, of an aluminium alloy, of a nickel alloy or of a tantalum alloy. Each sheet then defines one respective external face. The bipolar plates 5 may also be obtained by any other process, for example molding or injection molding based on carbon-polymer composites. The bipolar plates 5 may thus also be integrally formed. The external faces of the bipolar plate 5 are then defined by such an integrally formed part.

The stack may also comprise peripheral seals and membrane reinforcements that are not illustrated here.

Each cell 1 may further comprise a gas diffusion layer (not illustrated) placed between the anode and a bipolar plate, and another gas diffusion layer placed between the cathode and another bipolar plate.

Composite layers, i.e. layers of composite material, are frequently sold in the form of fibers pre-impregnated with polymerizable resin. These composite layers are frequently distributed in the form of rolls or spools. Reinforcing fibers such as carbon fibers are electrically conductive. The reinforcing fibers may also comprise non-conductive fibers combined with conductive reinforcing fibers.

Composite layers employing pre-impregnated fibers have the advantage of being easily deformable to shape them before the resin is polymerized. The polymerization of the resin then makes these layers very rigid. The invention aims to take advantage of a certain number of the properties of such pre-impregnated fibers, in the formation of gas diffusion devices that may, for example, be associated with bipolar plates.

The invention proposes to form a gas diffusion device. The invention proposes to compress a composite layer, including electrically conductive fibers and a polymerizable resin impregnating its fibers, against an electrically conductive element having an open porosity between two opposite faces, so as to bring the conductive fibers into contact with a first face of the electrically conductive element, and so as to make the resin flow into this conductive element without the resin impregnating all the volume of the conductive element. The resin having flowed is then polymerized.

At the end of the polymerization of the resin, the electrically conductive element preserves a gas-diffusion function, an optimal electrical connection is ensured between the rigid composite layer and the conductive element, and a mechanical connection is ensured between the composite layer and the conductive element. Furthermore, the gas diffusion device thus formed benefits from the rigidity of the composite once the resin has been polymerized.

Figure 2:
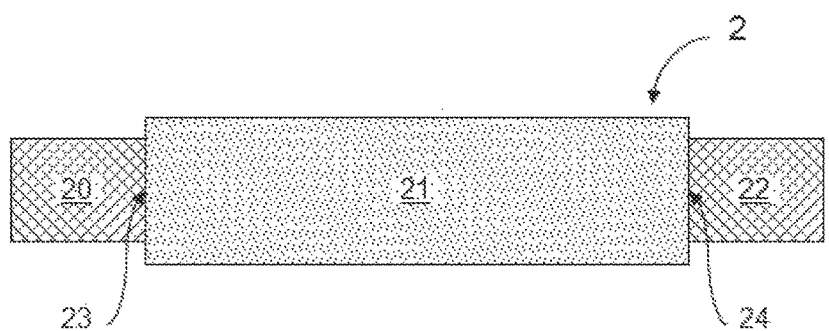

FIG. 2 is a cross-sectional view of an example of a gas diffusion device 2 in one step of a manufacturing process according to a first embodiment. The device 2 is formed from a porous and electrically conductive element 21, flanked on either side by composite layers 20 and 22. The layer 20 is placed in contact with a lateral external face 23 of the element 21. The layer 22 is placed in contact with an opposite lateral external face 24 of the element 21. The first embodiment may also be implemented with only one of the layers 20 and 22 against the conductive element 21. The layer 20, the element 21 and the layer 22 are here superposed in a horizontal direction.

The element 21 for example plays the role of gas diffusion layer within a bipolar plate. The element 21 is for example made of a foam, felt or fabric. Each of the layers 20 and 22 includes electrically conductive fibers, which are advantageously made of carbon. Carbon fibers are not only very rigid but also have very high electrical conductivity. Those skilled in the art will understand that other types of electrically conductive fibers may be used. The fibers are advantageously impregnated with a polymerizable resin (not shown). Once polymerized, the resin is impermeable to hydrogen. The layers 20 and 22 may thus act as seals or boundaries in channels, to allow hydrogen to flow. The polymerizable resin is for example a phenolic resin; this resin, once polymerized, is easily made impermeable to hydrogen. Furthermore, such a resin is also not very hydrolysable. The layers 20 and 22 are thus impermeable to hydrogen at the end of the manufacturing process. Those skilled in the art will understand that other resins may also be used in the context of the invention. Moreover, during the compression the layers 20 and 22 form dimensional shims for controlling the thickness of the obtained layer 21.

According to a secondary aspect of the invention, in particular in combination with a manufacturing process according to the second embodiment, one of the composite layers may include only electrically non-conductive fibers. According to a secondary aspect of the invention, in particular in combination with a manufacturing process according to the second embodiment, an element 21 may be electrically insulating. According to a secondary aspect of the invention, in particular in combination with a manufacturing process according to the second embodiment, an element 21 may be devoid of open porosity. It is thus possible to perform a seal function with the element 21.

Figure 3:
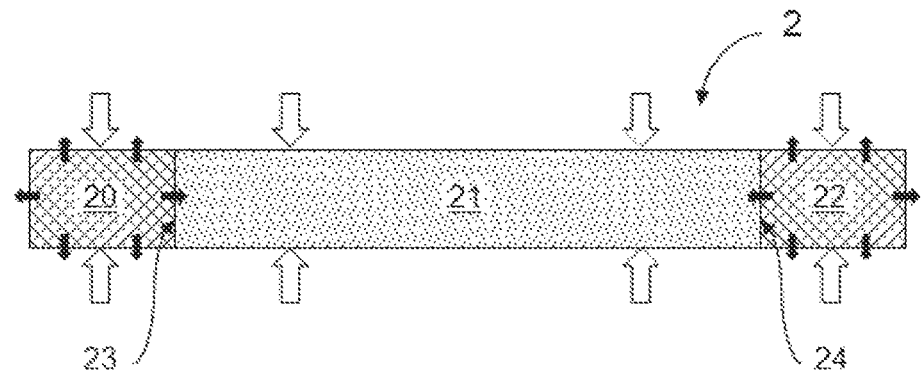

As illustrated in FIG. 3, a uniform pressure (illustrated by the white block arrows) is applied to the device 2 in a direction perpendicular to the upper and lower external surfaces of the element 21. The exerted pressure is for example comprised between 0.5 and 1.5 MPa. This compression allows, on the one hand, the uniformity of the heights of the layers 20 and 22 and of the element 21 to be increased, and, on the other hand, electrical interconnection of the carbon fibers to be ensured via penetration of these fibers into the respective faces 23 and 24 of the element 21, thus guaranteeing both mechanical and electrical contact between these fibers and the element 21. The compression also makes it possible to obtain a lateral flow (illustrated by the black block arrows) of the resin contained in the layers 20 and 22 to the porous element 21 in a longitudinal direction perpendicular to the direction of the exerted pressure. The resin flowing laterally from the layers 20 and 22 into the element 21 does not permeate all the volume of the element 21. Advantageously, the resin having flowed impregnates at most 30% of the volume of the conductive element 21. Provision may for example be made for the volume of the conductive element 21 to be larger than that of the layers 20 and 22. Specifically, the layers 20 and 22 will then not contain a sufficient amount of resin able to flow to impregnate all the volume of the conductive element 20. The resin flowing laterally from the layer 22 into the element 21 here passes through the face 24 without however reaching the face 23. Likewise, the resin flowing laterally from the layer 20 into the element 21 here passes through the face 23 without however reaching the face 24.

Figure 4:
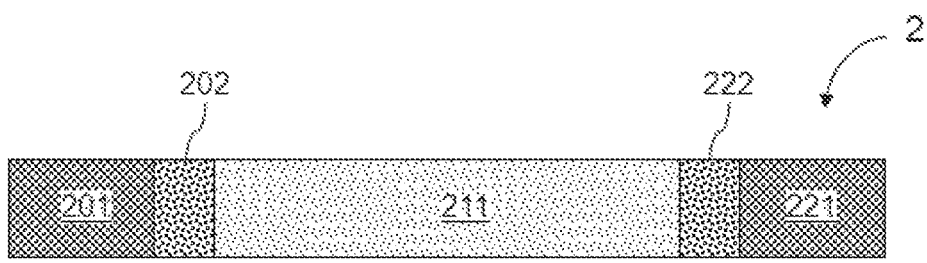

The compression is advantageously maintained, and the resin polymerized after it has flowed. After polymerization, the configuration illustrated in FIG. 4 is obtained. The layers 20 and 22 initially containing the unpolymerized resin form solidified and electrically conductive composite layers 201 and 221, respectively. The excess resin having flowed from the layers 20 and 22 into the element 21 forms zones 202 and 222 solidified by the polymerized resin, respectively. Finally, a middle zone 211 obtained from the element 21 is not impregnated with resin and preserves its porosity at the center of the device 2.

As mentioned above, this first embodiment may also be implemented with only the layer 20 against the conductive element 21. In this case (not shown), the face 24 of the conductive element 21 will preserve its open porosity.

Thus, at the end of the steps of a manufacturing process according to a first embodiment, which is said to employ lateral flow, an integrally formed, rigid, conductive gas diffusion device 2 that has a porous zone 211 at its center and two solidified rigid composite layers 201 and 221 at its ends, is obtained. The composite layers 201 and 221 are electrically conductive in their thickness.

Figure 5:
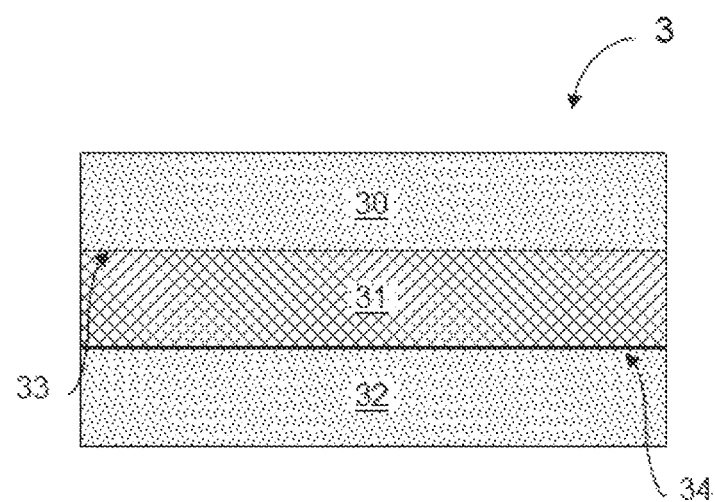

FIG. 5 is a cross-sectional view of an example of a gas diffusion device 3 in one step of a manufacturing process according to a second embodiment. The device 3 is formed from a composite layer 31 flanked on either side by porous and electrically conductive elements 30 and 32. The element 30, the layer 31 and the element 32 are here superposed in a vertical direction. The layer 30 is placed in contact with an upper external face 33 of the element 31. The layer 32 is placed in contact with an opposite lower external face 34 of the element 31. The second embodiment may also be implemented with only one of the layers 30 and 32 superposed on the composite layer 31.

The layer 31 includes electrically conductive fibers, which are advantageously made of carbon; and a polymerizable resin (not shown) that advantageously impregnates the fibers. The polymerizable resin is for example a phenolic resin; this resin, once polymerized, is impermeable to hydrogen. The layers 30 and 32 are thus impermeable to hydrogen at the end of the manufacturing process.

Figure 6:
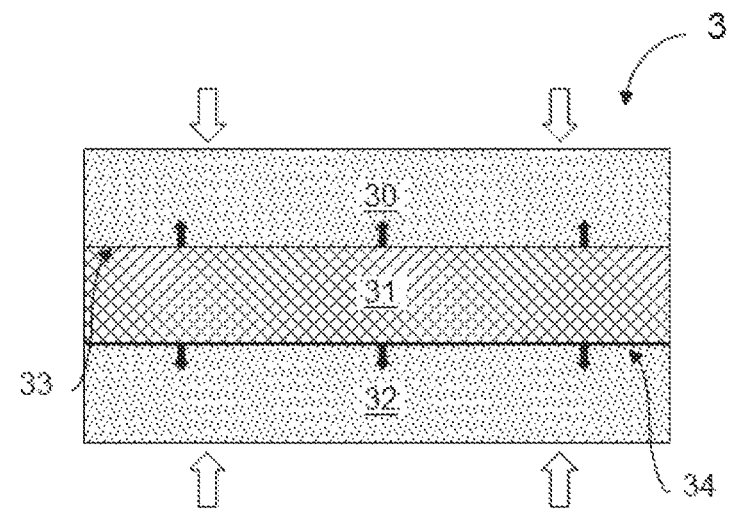

As illustrated in FIG. 6, a uniform pressure (illustrated by the white block arrows) is applied to the device 3 in a direction perpendicular to the faces 33 and 34 of the element 31. This compression allows electrical interconnection of the carbon fibers to be ensured via penetration of these fibers into the respective faces 33 and 34 of the element 31, thus guaranteeing both mechanical and electrical contact between these fibers and the element 31. The compression also makes it possible to obtain a vertical flow (illustrated by the black block arrows) of the resin contained in the layer 31 to the porous elements 30 and 32 in a direction parallel to the direction of the exerted pressure. The resin flowing vertically from the member 31 to the layers 30 and 32 does not impregnate all the volume of the layers 30 and 32. For example, provision may be made for the volume of the layers 30 and 32 to be larger than that of conductive element 31. Specifically, the conductive element 31 will then not contain a sufficient amount of resin able to flow to impregnate all the volume of the conductive layers 30 and 32. The resin flowing vertically from the layer 31 into the element 32 here passes through the face 34 without however reaching the opposite external face of the element. Likewise, the resin flowing vertically from the layer 31 into the element 30 here passes through the face 33 without however reaching the opposite external face of the element.

Figure 7:
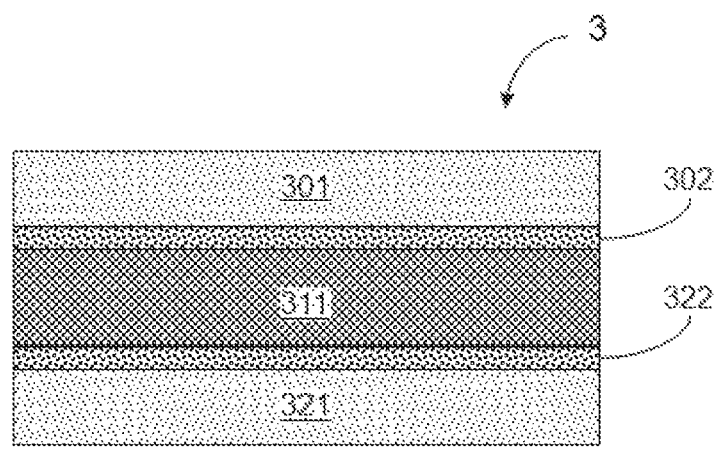
FIG. 7 are cross-sectional views of a gas diffusion device in various steps of its manufacturing process according to a second embodiment, which is said to employ vertical flow.

The compression is maintained, and the resin polymerized after it has flowed. The configuration illustrated in FIG. 7 is obtained. The layer 31 that initially contained the unpolymerized resin forms a solidified and electrically conductive composite layer 311. The excess resin having flowed from the layer 31 into the elements 30 and 32 forms zones 302 and 322 solidified by the polymerized resin having flowed, respectively. Finally, the zones 301 and 321 obtained from the elements 30 and 32, respectively, remain porous at the vertical ends of the device 3.

Thus, at the end of the steps of a manufacturing process according to a second embodiment, which is said to employ vertical flow, an integrally formed, rigid, conductive gas diffusion device 3 that has porous zones 301 and 321 at its vertical ends and a solidified rigid composite layer 311 at its center, is obtained. The composite layer 311 is electrically conductive in its thickness.

Figure 8:
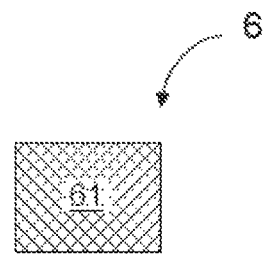
FIG. 8,
FIG. 9,
FIG. 10,
FIG. 11,
FIG. 12 and
FIG. 13 are cross-sectional views of a solidified-groove gas diffusion device in various steps of its manufacturing process according to a third embodiment.

FIG. 8 is a cross-sectional view of a composite layer 61, used in a process for manufacturing a gas diffusion device 6 according to a third embodiment. The layer 61 includes electrically conductive fibers, which are advantageously made of carbon; and a polymerizable resin (not shown) that advantageously impregnates the fibers. The polymerizable resin is for example a phenolic resin; this resin, once polymerized, is impermeable to hydrogen.

Figure 9:
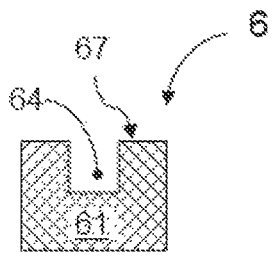

The configuration shown in FIG. 9 is obtained by forming a groove 64 in an external face 67 of the element 61. The groove 64 extends in a direction perpendicular to the plane of the cross section shown. This step of forming the groove 64 may for example be carried out by laser engraving. Formation of the groove 64 advantageously results in local heating of the faces formed in this groove 64, in order to polymerize the resin on these faces. Laser engraving, or laser beam machining, for example allows such local heating to be achieved. Local heating allows the rest of the resin not to be polymerized, so that the latter may flow in subsequent steps of the process.

Figure 10:
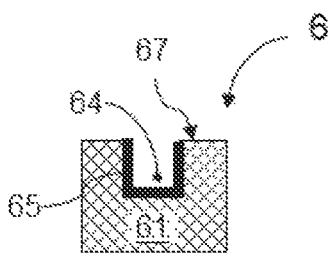

The configuration shown in FIG. 10, in which a layer 65 of polymerized and therefore impermeable resin has been formed, is obtained. The layer 65 thus forms a shell on the faces of the groove 64.

Figure 11:
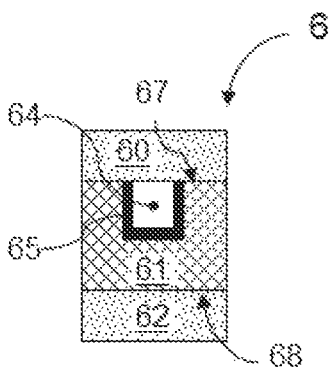

An electrically conductive porous element 60 is then positioned in contact with the face 67 of the layer 61 in which the groove 64 was produced. A second electrically conductive porous element 62 is here positioned facing the element 60, in contact with an external face 68 of the layer 61 opposite the face 67. The configuration shown in FIG. 11 is obtained; the device 6 is now formed from a superposition of the elements 60 and 62 and of the layer 61. The elements 60 and 62 advantageously have a thickness comprised between 40 and 350 micrometers.

Figure 12:
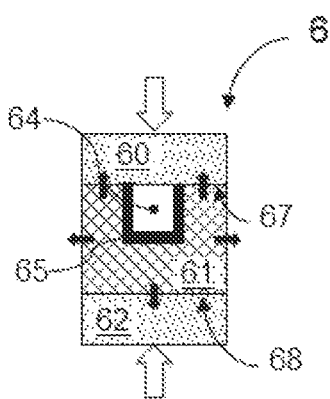

As illustrated in FIG. 12, a uniform pressure (illustrated by the white block arrows) is then applied to the device 6 in a direction perpendicular to the surfaces 67 and 68 of the layer 61. This compression allows electrical interconnection of the carbon fibers to be ensured via penetration of these fibers into the respective surfaces 67 and 68 of the layer 61, thus guaranteeing both mechanical and electrical contact between these fibers and the layer 61. The compression also makes it possible to obtain a vertical flow (illustrated by the black block arrows) of the resin contained in the layer 61 to the porous elements 60 and 62 in a direction parallel to the direction of the exerted pressure. The resin flowing vertically from the layer 61 to the elements 60 and 62 does not impregnate all the volume of these layers 60 and 62. For example, provision may be made for the volume of the elements 60 and 62 to be larger than that of layer 61.

Specifically, the layer 61 will then not contain a sufficient amount of resin able to flow to impregnate all the volume of the conductive elements 60 and 62. The resin flowing vertically from the layer 61 into the element 62 here passes through the face 68 without however reaching the opposite external face of the element. Likewise, the resin flowing vertically from the layer 61 into the element 60 here passes through the face 67 without however reaching the opposite external face of the element. Due to the presence of the layer 65 of polymerized and therefore impermeable resin on the faces of the groove 64, the resin of the layer 61 cannot flow into the groove 64.

Figure 13:
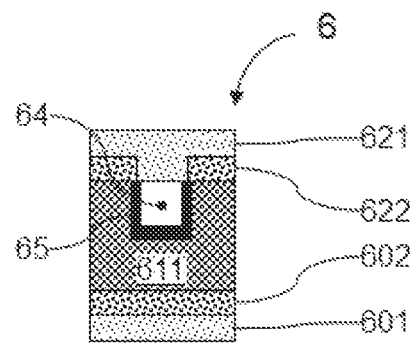

The compression is maintained, and the resin polymerized after it has flowed. The configuration illustrated in FIG. 13 is obtained. The layer 61 that initially contained the unpolymerized resin forms a solidified and electrically conductive composite layer 611. The excess resin having flowed from the layer 61 into the elements 60 and 62 forms zones 602 and 622 solidified by the polymerized resin having flowed, respectively. Zones 601 and 621 obtained from the elements 60 and 62, respectively, remain porous at the ends of the device 6.

Thus, at the end of the steps of a manufacturing process according to a third embodiment, an integrally formed, rigid, conductive gas diffusion device 6 that has porous zones 601 and 621 at its ends and a solidified composite layer 611 at its center is obtained, there being, in said layer, a groove 64 the bottom and walls of which are impermeable and able to allow reactive fluids to flow. The composite layer 611 is electrically conductive in its thickness.

Figure 14:
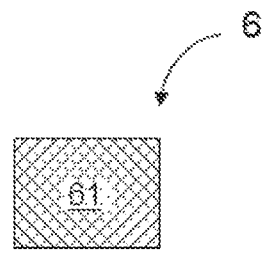
FIG. 14,
FIG. 15,
FIG. 16,
FIG. 17 and
FIG. 18 are cross-sectional views of a non-solidified-groove gas diffusion device in various steps of its manufacturing process according to a fourth embodiment.

FIG. 14 is a cross-sectional view of a composite layer 61, used in a process for manufacturing a gas diffusion device 6 according to a fourth embodiment. The layer 61 includes electrically conductive fibers, which are advantageously made of carbon; and a polymerizable resin (not shown) that advantageously impregnates the fibers. The polymerizable resin is for example a phenolic resin; this resin, once polymerized, is impermeable to hydrogen.

Figure 15:
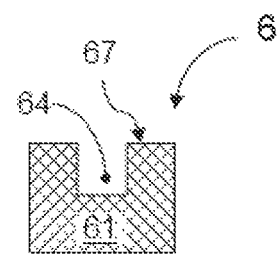

The configuration shown in FIG. 15 is obtained by forming a groove 64 in an external face 67 of the element 61, in a direction perpendicular to the plane of the cross section shown. This step of forming the groove 64 may for example be carried out by mechanical machining. The formation of the groove 64 avoids excessive heating of the resin in the groove 64, in order not to polymerize the resin on the faces of this groove 64.

Figure 16:
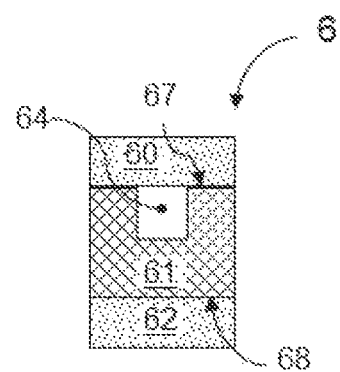

An electrically conductive porous element 60 is then positioned in contact with the face 67 of the layer 61 in which the groove 64 was produced. A second electrically conductive porous element 62 is here positioned facing the element 60, in contact with an external face 68 of the layer 61 opposite the face 67. The configuration shown in FIG. 16 is obtained; the device 6 is now formed from a superposition of the elements 60 and 62 and of the layer 61.

Figure 17:
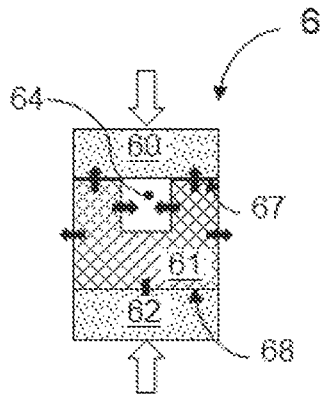

As illustrated in FIG. 17, a uniform pressure (illustrated by the white block arrows) is then applied to the device 6 in a direction perpendicular to the surfaces 67 and 68 of the layer 61. This compression allows electrical interconnection of the carbon fibers to be ensured via penetration of these fibers into the respective surfaces 67 and 68 of the layer 61, thus guaranteeing both mechanical and electrical contact between these fibers and the layer 61. The compression also makes it possible to obtain a flow (illustrated by the black block arrows) of the resin contained in the layer 61 to the porous elements 60 and 62 in a direction parallel to the direction of the exerted pressure, and to the groove 64. The resin flowing vertically from the layer 61 to the elements 60 and 62 does not impregnate all the volume of these layers 60 and 62. For example, provision may be made for the volume of the elements 60 and 62 to be larger than that of the layer 61. Specifically, the layer 61 will then not contain a sufficient amount of resin able to flow to impregnate all the volume of the conductive elements 60 and 62. The resin flowing vertically from the layer 61 into the element 62 here passes through the face 68 without however reaching the opposite external face of the element. Likewise, the resin flowing vertically from the layer 61 into the element 60 here passes through the face 67 without however reaching the opposite external face of the element. The groove 64 is completely filled with resin.

Figure 18:
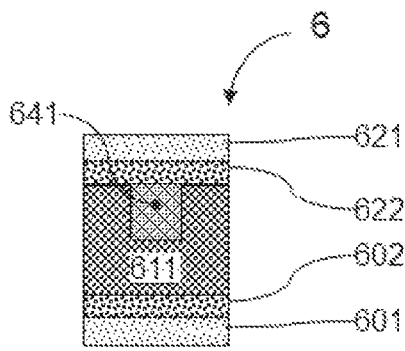

The compression is maintained, and the resin polymerized after it has flowed. The configuration illustrated in FIG. 18 is obtained. The layer 61 that initially contained the unpolymerized resin forms a composite layer 611 of solidified conductive composite. The groove 64 forms an insert 641 of polymerized resin. The excess resin having flowed from the layer 61 into the elements 60 and 62 forms zones 602 and 622 solidified by the polymerized resin having flowed, respectively. Finally, the zones 601 and 621 obtained from the elements 60 and 62, respectively, remain porous at the ends of the device 6.

Thus, at the end of the steps of a manufacturing process according to a fourth embodiment, an integrally formed, rigid, conductive gas diffusion device 6 that has porous zones 601 and 621 at its ends and a solidified composite layer 611 at its center, is obtained. The composite layer 611 is electrically conductive in its thickness.

Figure 19:
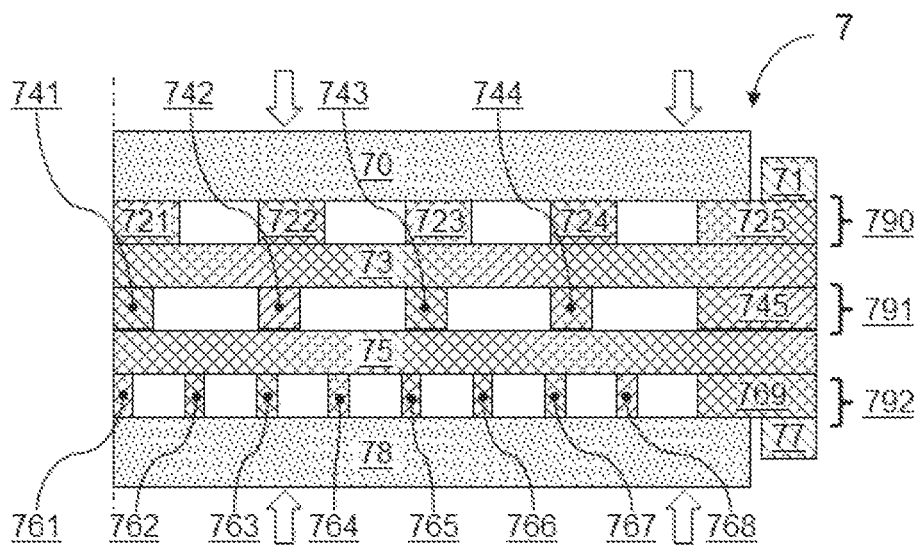
FIG. 19 and
FIG. 20 are partial cross-sectional views of an example of a bipolar plate in various steps of its manufacturing process according to one embodiment of the invention using a gas diffusion device.

FIG. 19 is a partial cross-sectional view of a bipolar plate 7 obtained using a manufacturing process implementing a plurality of the embodiments described above. The bipolar plate 7 includes electrically conductive porous elements 70 and 78. These elements for example play the role of gas diffusion layer on each external face of the bipolar plate.

The bipolar plate 7 also includes layers 790, 791 and 792 formed from composite elements that are distributed as follows:

elements 721, 722, 723, 724 and 725 form a layer 790. This layer is placed between the porous element 70 and a composite element 73. The element 725 placed at the external end of the layer 790 is completed by an element 71, which is also a composite element, placed in the transverse extension of the porous element 70. Thus bounded, the layer 790 may for example be considered to be a gas diffusion device, and advantageously plays, within the bipolar plate 7, the role of an anode circuit. This is why this layer 790 is also designated a gas diffusion device 790. The distance between the elements 721, 722, 723, 724 and 725 is configured to be sufficient to prevent the recesses separating them from being filled with resin;

elements 741, 742, 743, 744 and 745 form the layer 791. This layer is placed between the element 73 and an element 75, which is also a composite element. Thus bounded, the layer 791 advantageously plays, within the bipolar plate 7, the role of a cooling circuit. To reinforce the impermeability of the layer 791 while guaranteeing its mechanical strength and its ability to play its roles as electrical conductor and heat exchanger, a metal layer (not shown) may advantageously be introduced into the layer 791 to achieve impermeability to gases. Such a metal layer may also be replaced by a layer of graphene, which is for example deposited by chemical vapor deposition. The distance between the elements 741, 742, 743, 744 and 745 is configured to be sufficient to prevent the recesses separating them from being filled with resin;

elements 761, 762, 763, 764, 765, 766, 767, 768 and 769 form a layer 792. This layer is placed between the element 75 and the porous element 78. The element 769 placed at the external end of the layer 792 is completed by an element 77, which is also a composite element, placed in the transverse extension of the porous element 78. Thus bounded, the layer 792 may for example be considered to be a gas diffusion device and advantageously plays, within the bipolar plate 7, the role of a cathodic circuit (the flow channels are here wider in order to promote the flow of a more viscous reagent fluid). This is why this layer 792 is also designated a gas diffusion device 792. The distance between the elements 761, 762, 763, 764, 765, 766, 767, 768 and 769 is configured to be sufficient to prevent the recesses separating them from being filled with resin.

Each of the elements 71, 721 to 725, 73, 741 to 745, 75, 761 to 769 and 77 includes electrically conductive fibers, which are advantageously made of carbon; and a polymerizable resin (not shown) that advantageously impregnates the fibers. Once the resin has been polymerized, the elements 71, 721 to 725, 73, 741 to 745, 75, 761 to 769 and 77 are impermeable to hydrogen. The polymerizable resin is for example a phenolic resin; this resin, once polymerized, is easily made impermeable to hydrogen. Those skilled in the art will understand that other resins may also be used in the context of the invention. It is thus advantageously possible to use different resins to produce the gas diffusion devices 790 and 792, depending on the desired properties in terms of mechanical strength or impermeability to the fluids used in the context of a fuel-cell stack.

Figure 20:
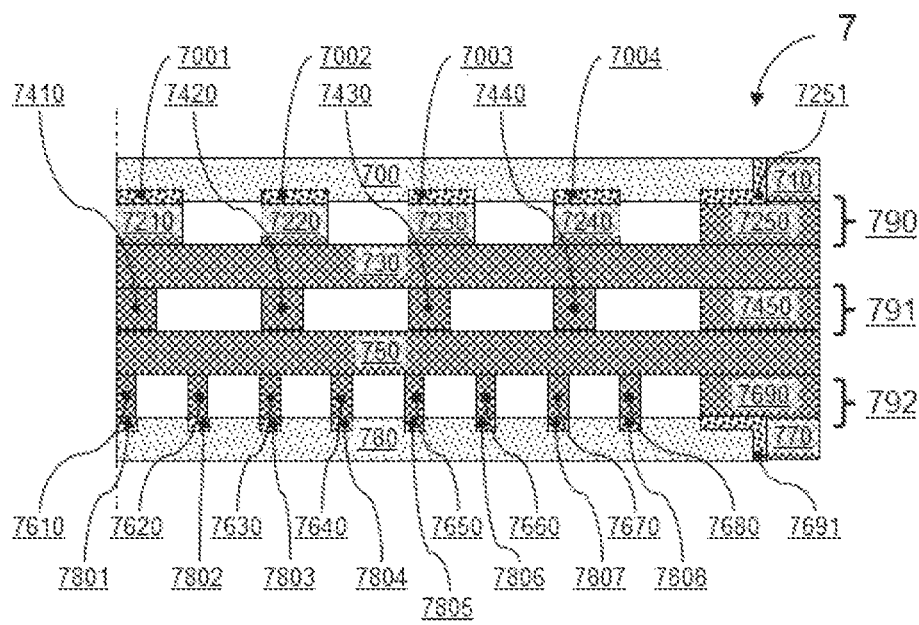

In the manufacturing process according to the third embodiment described above, a uniform pressure (illustrated by the white block arrows) is applied in a direction perpendicular to the upper external surface of the element 70 and to the lower external surface of the element 78. The resin (illustrated by the black block arrows) is then made to flow from the composite elements to the electrically conductive porous elements 70 and 78. The resin is then polymerized. The configuration illustrated in FIG. 20 is thus obtained (for the sake of simplicity, the overflow of resin into the channels formed has not been illustrated), in which:

the element 71 forms a polymerized composite element 710;

the elements 721 to 725 form polymerized elements 7210, 7220, 7230, 7240 and 7250, and elements 7001, 7002, 7003, 7004 and 7251 of polymerized resin having flowed into the porous element 70;

the element 70 thus forms an electrically conductive porous element 700;

the element 73 forms a polymerized composite element 730;

the elements 741 to 745 form polymerized elements 7410, 7420, 7430, 7440 and 7450;

the element 75 forms a polymerized composite element 750;

the elements 761 to 769 form polymerized elements 7610, 7620, 7630, 7640, 7650, 7660, 7670, 7680, 7690, and elements 7801, 7802, 7803, 7804, 7805, 7806, 7807, 7808 and 7691 of polymerized resin having flowed into the porous element 78;

the element 78 thus forms an electrically conductive porous element 780;

the element 77 forms a polymerized composite element 770.

Conductive joints such as described above are formed between the layer 790 and layers 70 and 73, between the layer 791 and the layers 73 and 75, and between the layer 792 and layers 78 and 73.

Thus, at the end of the steps of a manufacturing process according to the third embodiment described above, a bipolar plate 7 is obtained in which:
- the anode-circuit function is advantageously performed by the layer 790;
- the cooling-circuit function is advantageously performed by the layer 791;
- the cathode-circuit function is advantageously performed by the layer 792.

These circuits are thus formed from polymerized composite elements mechanically associated with porous elements, the whole formed thereby being electrically conductive while remaining impermeable to the various reactive fluids used in the context of a fuel-cell stack.

The polymerizing operation may for example be carried out by applying a gas flow to the flow channels at a temperature advantageously above 35° C.

Figure 21:
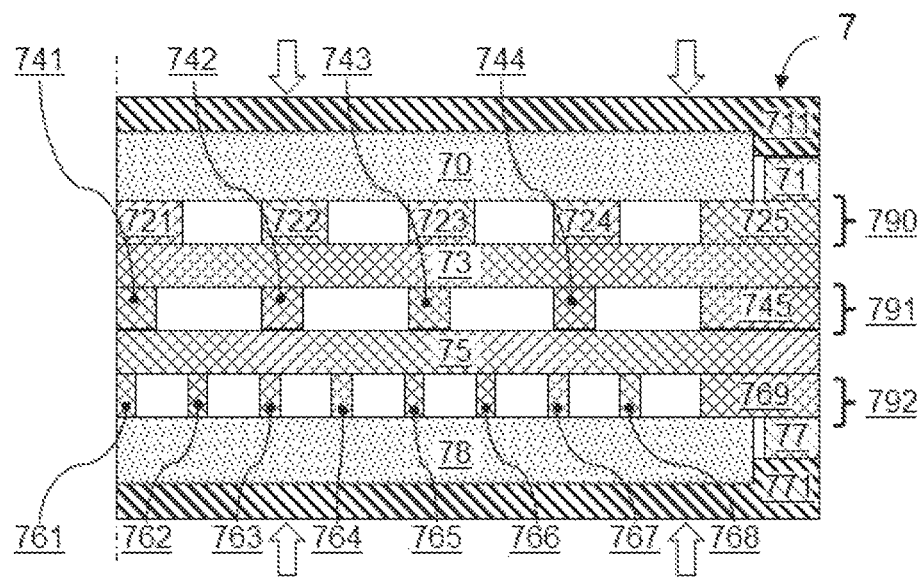
FIG. 21 and
FIG. 22 are partial cross-sectional views of an example of a bipolar plate in various steps of its manufacturing process according to one embodiment of the invention using a gas diffusion device.

FIG. 21 is a partial cross-sectional view of a bipolar plate 7 obtained using a manufacturing process implementing a plurality of the embodiments described above. The configuration illustrated in FIG. 21 is based on the configuration illustrated in FIG. 19 and described above, to which has been added:
- a rigid mold 711 placed on the upper external face of the element 70;
- a rigid mold 771 placed under the lower external face of the element 78.

The manufacturing process according to the third embodiment described above is implemented on the bipolar plate 7. The steps of the manufacturing process are identical to those described with reference to FIG. 19, the only difference being the use of the molds 711 and 771. The molds 711 and 771 allow the elements intended to form the bipolar plate 7 to be held in place during the compression and polymerization, while constraining the obtained shape of the elements 70 and 78.

Figure 22:
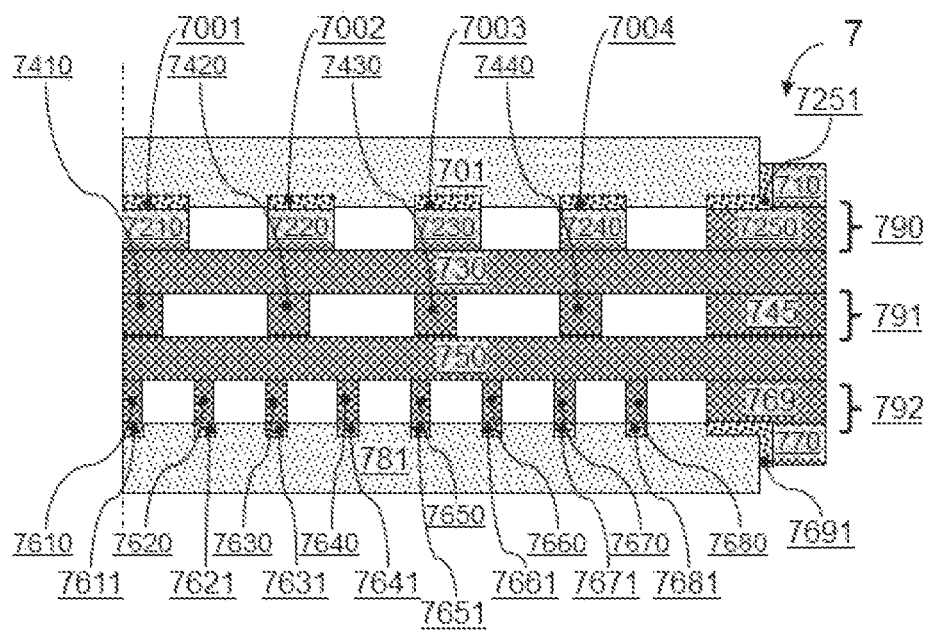

Thus, after molding, compression and polymerization, an element 701 is obtained from the element 70. Likewise, after molding, compression and polymerization, an element 781 is obtained from the element 78. The configuration illustrated in FIG. 22 is obtained. The shape of the molds 711 and 771 makes it possible to precisely and independently control the final thicknesses of the elements 710 and 701, and of the elements 770 and 781.

Thus, at the end of the steps of a manufacturing process according to the third embodiment described above, a bipolar plate 7 is obtained in which:
- the anode-circuit function is advantageously performed by the layer 790;
- the cooling-circuit function is advantageously performed by the layer 791;
- the cathode-circuit function is advantageously performed by the layer 792.

These circuits are thus formed from polymerized composite elements mechanically associated with porous elements, the whole formed thereby being electrically conductive while remaining impermeable to the various reactive fluids used in the context of a fuel-cell stack.

The polymerizing operation may for example be carried out by applying a gas flow to the flow channels at a temperature advantageously above 35° C.

Figure 23:
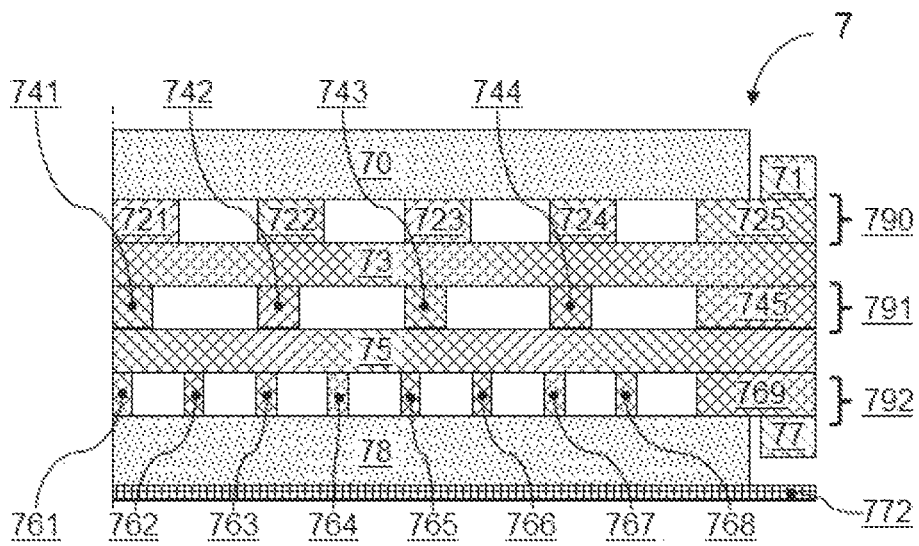
FIG. 23 and
FIG. 24 are partial cross-sectional views of an example of a bipolar plate in various steps of its manufacturing process according to one embodiment of the invention using a gas diffusion device.

FIG. 23 is a partial cross-sectional view of a bipolar plate 7 obtained using a manufacturing process implementing a plurality of the embodiments described above. The configuration illustrated in FIG. 23 is based on the configuration illustrated in FIG. 19 and described above, to which has been added an impermeable membrane-electrode assembly 772, the latter being placed under the lower external face of the element 78.

The manufacturing process according to the third embodiment described above is implemented to manufacture the bipolar plate 7. The steps of this manufacturing process are identical to those described with reference to FIG. 19, the plate 772 being used here. A fuel-cell stack will eventually be produced by stacking a plurality of bipolar plates 7. The plate 772 is intended to form a lower external face of the future fuel-cell stack: the plate 772 makes it possible to ensure the rigidity and impermeability of the stack.

Figure 24:
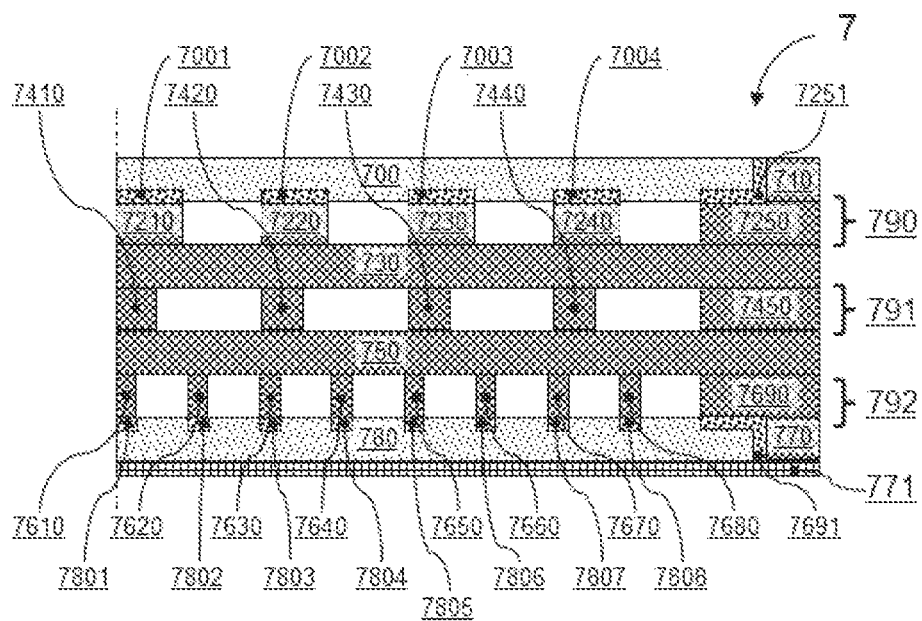

Thus, after molding, compression and polymerization, the configuration shown in FIG. 24 is obtained.

Thus, at the end of the steps of a manufacturing process according to the third embodiment described above, a bipolar plate 7 is obtained in which:
- the anode-circuit function is advantageously performed by the layer 790;
- the cooling-circuit function is advantageously performed by the layer 791;
- the cathode-circuit function is advantageously performed by the layer 792.

These circuits are thus formed from polymerized composite elements mechanically associated with porous elements, the whole formed thereby being electrically conductive while remaining impermeable to the various reactive fluids used in the context of a fuel-cell stack, hydrogen in particular.

The polymerizing operation may for example be carried out by applying a gas flow to the flow channels at a temperature advantageously above 35° C.

The invention claimed is:

1. A process for manufacturing a gas diffusion device, comprising:
   providing a superposition of a composite layer and an electrically conductive element, the composite layer including electrically conductive fibers and a polymerizable resin impregnating the electrically conductive fibers, and the electrically conductive element having an open porosity between a first face and a second face;
   compressing the superposition of the composite layer and the electrically conductive element so as to bring the electrically conductive fibers into contact with the first face of the electrically conductive element, so as to make the resin flow into the electrically conductive element without the resin impregnating all of a volume of said electrically conductive element; and
   polymerizing the resin having flowed and polymerizing the resin of the composite layer so that the composite layer becomes impermeable to hydrogen.

2. The manufacturing process as claimed in claim 1, wherein the superposed electrically conductive element takes a form of a plate having first and second lateral borders forming the first face and second face of the electrically conductive element, respectively.

3. The manufacturing process as claimed in claim 2, wherein the superposed electrically conductive element is compressible, the compressing including compression of the electrically conductive element in a direction normal to an external surface extending between the first and second lateral borders.

4. The manufacturing process as claimed in claim 3, wherein the superposed electrically conductive element and composite layer have different thicknesses at rest, the compression of the electrically conductive element in the direction normal to the external surface being implemented so that the electrically conductive element and the composite layer have a same thickness during the compression.

5. The manufacturing process as claimed in claim 1, wherein the superposed composite layer comprises a groove covered by the superposed electrically conductive element.

6. The manufacturing process as claimed in claim 5, comprising a prior step of forming the groove in the composite layer and of polymerizing the resin on faces of the groove.

7. The manufacturing process as claimed in claim 6, wherein forming the groove and polymerizing the resin on the faces of the groove are carried out by laser engraving the composite layer.

8. The manufacturing process as claimed in claim 6, wherein polymerizing the resin on the faces of the groove includes applying a gas flow to the groove at a temperature above 35° C.

9. The manufacturing process as claimed in claim 1, wherein the superposed electrically conductive element has a thickness comprised between 40 and 350 micrometers.

10. The manufacturing process as claimed in claim 1, wherein the electrically conductive element is a layer of foam, felt or fabric.

11. The manufacturing process as claimed in claim 1, wherein the resin is a phenolic resin.

12. The manufacturing process as claimed in claim 1, wherein the superposition is compressed with a pressure comprised between 0.5 and 1.5 MPa.

13. The manufacturing process as claimed in claim 1, wherein the compression is carried out so as to make the resin flow into the electrically conductive element without the resin reaching the second face.

14. The manufacturing process as claimed in claim 1, wherein the compression is carried out so that the resin impregnates at most 30% of a volume of the electrically conductive element.

15. A process for manufacturing a bipolar plate, comprising
   forming a first gas diffusion device using the process as claimed in claim 1;
   forming a second gas diffusion device using the process as claimed in claim 1; and,
   superposing the first and second gas diffusion devices.

16. The process for manufacturing a bipolar plate as claimed in claim 15, wherein polymerizable resins used to form the first gas diffusion device and to form the second gas diffusion device have different chemical compositions.

17. The process for manufacturing a bipolar plate as claimed in claim 15, comprising introducing a metal layer between the superposed first and second gas diffusion devices.

* * * * *